T. LAROSE.
PLANT CANE SHAVER AND GRASS SCRAPER.
APPLICATION FILED OCT. 17, 1912.
1,058,607.
Patented Apr. 8, 1913.
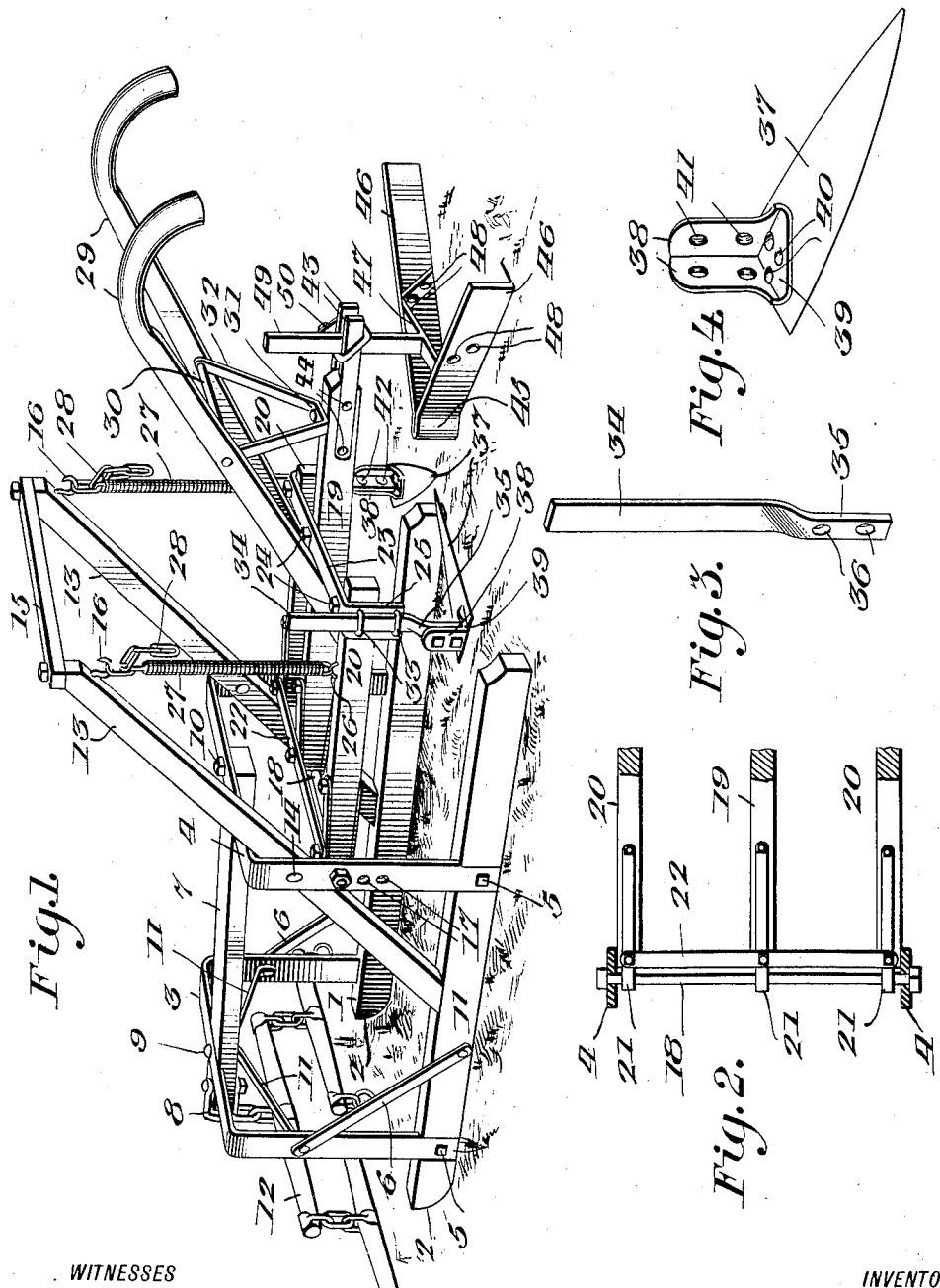
WITNESSES
Philip E. Barnes
C. E. Trainor
INVENTOR
Theophile Larose
BY Munn & Co.
ATTORNEYS

UNITED STATES PATENT OFFICE.

THEOPHILE LAROSE, OF LABADIEVILLE, LOUISIANA, ASSIGNOR OF ONE-HALF TO GUS VILLERE, OF LABADIEVILLE, LOUISIANA.

PLANT-CANE SHAVER AND GRASS-SCRAPER.

1,058,607.          Specification of Letters Patent.          Patented Apr. 8, 1913.

Application filed October 17, 1912. Serial No. 726,277.

*To all whom it may concern:*

Be it known that I, THEOPHILE LAROSE, a citizen of the United States, and a resident of Labadieville, in the parish of Assumption and State of Louisiana, have made a new and useful Improvement in Plant-Cane Shavers and Grass-Scrapers, of which the following is a specification.

My invention is an improvement in a plant cane shaver and grass scraper, and has for its object the provision of mechanism of the character specified, having adjustable cutting devices and an adjustable deflecting device, the said devices being supported yieldingly by the main frame and capable of adjustment on the said main frame.

In the drawings:—Figure 1 is a perspective view of the improved machine, Fig. 2 is a transverse section of a portion of the frame, Fig. 3 is a perspective view of one of the cutting blade supports, and Fig. 4 is a similar view of one of the blades.

The present embodiment of the invention comprises a pair of laterally spaced approximately parallel runners, each of which has its front end rounded at the lower corner as shown at 2, and the said runners are connected by two arches or substantially U-shaped brackets 3 and 4, each consisting of a body and arms, the bodies being arranged transversely of the runners with the arms connected to the runners by means of bolts 5 or the like. The front bracket 3 has its arms braced against the adjacent runners by means of braces 6, and a draft bar 7 connects the bodies of the brackets, the front end of the draft bar extending beyond the bracket 3 and having connected therewith a clevis 8. The draft bar 7 is secured to the bodies of the brackets 3 and 4 by means of bolts 9 and 10 respectively and braces 11 are arranged between the bolt 9 and the arms of the bracket 3. A double-tree 12 or other draft mechanism is connected to the clevis 8, and inclined standards 13 extend upwardly and rearwardly from the runners, the said standards being connected to the arms of the bracket 4 by means of bolts or rivets 14, and the rear ends of the standards are connected by a cross bar 15. The rear ends of the standards 13 are directly above the rear ends of the runners 1, and a hook 16 depends from the rear end of each of the said standards. Each of the arms of the bracket 4 is provided with a vertically spaced series of openings 17, and a shaft 18 is journaled in registering openings of the series. An auxiliary frame is journaled on the shaft at its front end, the said frame consisting of a central bar 19 and lateral bars 20, each of the said bars having a bearing 21 at its front end journaled on the shaft. The bars are connected at their front ends and held in spaced relation by means of a strap 22, which is bolted to each of the said bars, and at the rear ends of the bars 20, the said bars 20 and 19 are connected by means of a plate 23 secured to the bars by bolts 24, and the ends of the plate are bent laterally downward as shown at 25 on the outer side of each of the bars 20. It will be noticed that the bar 19 extends rearwardly beyond the lateral bars 20. Each of the bars 20 is provided near the plate 23 with a loop or eye 26, and a coil spring 27 connects each of the loops or eyes with the adjacent hook 16, before mentioned. The upper end of each of the springs 27 is connected to the hook by means of a chain 28, and it will be evident that by engaging different links of the chain with the hook the tension of the springs 27 may be adjusted. The rear end of the auxiliary frame is thus supported by the springs to yield downwardly with respect to the main frame.

Handles 29 are connected at their forward ends to the bars 20, and the said handles extend upwardly and rearwardly, and are connected intermediate their ends by means of a cross bar 30. A substantially V-shaped brace is arranged between the cross bar 30 and the rear end of the bar 19, the body 31 of the said brace being bolted to the bar 19, while the arms 32 of the brace are provided with openings for receiving the cross bar 30. The handles rest near their connection with the bars 20 on the cross plate 23, and by means of the handles the auxiliary frame may be raised or lowered. Each of the angular portions 25 of the plate 23 is provided with a pair of vertically spaced guides or staples 33, and a supporting bar 34 is slidable in each of the said pairs. Each of the supporting bars 31 has its lower end 35 offset outwardly and the said end is twisted as shown more particularly in Fig. 3 so that its plane is at an angle with respect to the plane of the upper end of the supporting bar, and each of the offset portions is provided with a pair of vertically spaced openings 36. A cutting blade 37 of approximately triangular form is supported by each bar, (Fig. 4). Each of the said blades is as before stated, approximately triangular, being of greater width at its outer end and gradually decreasing to a point at its inner end. A bracket is secured to the outer end or base of each blade, each of the said brackets consisting of wings 38, arranged at a right angle to each other, and a connecting web 39 at the lower ends of the wings 38, the said web being connected to the blade by means of rivets 40. Each of the wings 38 is provided with spaced openings 41 adapted to register with the openings 36 of the supporting bar 34—35, and bolts or rivets 42 are passed through the registering openings for securing the blades to the supports. It will be noticed from an inspection of Fig. 1 that the blades extend inwardly and rearwardly toward each other, the points of the blades being so arranged that the blades will cut over all of the space between the portions 35 of the supporting bars.

A pair of fish plates 43 are secured to the rear end of the bar 19 by means of bolts or rivets 44, and a deflecting device is supported by the fish plates. The said device comprises a plate bent to form a peak 45 and diverging wings 46, the said wings being connected by means of a T bar. The cross member 47 of the T bar has its ends bent laterally and bolted to the wings 46 as indicated at 48, while the stem 49 of the T is connected to the fish plates by means of a clevis or clip 50. The connection is such that the stem 49 of the T bar may be adjusted vertically to raise or lower the deflecting device, while the deflecting device, as a whole, is carried by the auxiliary frame.

It will be evident from the description, that the driver or operator who holds the handles 29 has complete control over the auxiliary frame, being able to hold the blades and the deflecting device at whatever level he may desire. The front end of the auxiliary frame may be adjusted vertically by engaging the shaft 18 with different openings of the series 17, and when so adjusted, the effective length of the springs 27 is adjusted to correspond in such manner that the auxiliary frame will occupy a horizontal position. The depth at which the knives or blades 37 cut may be thus adjusted, and the deflecting device may be adjusted to correspond.

In operation, the blades and the deflecting device are adjusted as desired, after which the machine is drawn over the field. It will be evident that the blades will cut everything between the supporting bars and that the deflecting device will deflect whatever is cut to each side, leaving the central portion, that is, the space between the bars 34 clear.

I claim:—

1. A machine of the character specified, comprising laterally spaced runners, approximately U-shaped brackets having their bodies arranged transversely of the runners above the same and their arms connected to the runners, a draft bar connected to the bodies of the brackets intermediate the runners, inclined standards secured to the runners and to the rear bracket and extending upwardly and rearwardly, a shaft journaled in the arms of the rear bracket and adjustable vertically of the said arms, an auxiliary frame comprising a central and lateral bars, the said bars being connected and journaled at their front ends on the shaft, the central bar extending rearwardly of the lateral bars, handles connected to the auxiliary frame and extending rearwardly, a blade supporting standard mounted to slide vertically at the rear end of each lateral bar, an inwardly and rearwardly extending blade connected with the lower end of each of the supporting standards, a deflecting device adjustably connected with the rear end of the central bar, said device consisting of wings connected at their front ends and diverging rearwardly, springs connected at their lower ends to the auxiliary frame, and an adjustable connection between the upper end of each spring and the adjacent standard.

2. A machine of the character specified, comprising laterally spaced runners, approximately U-shaped brackets having their bodies arranged transversely of the runners above the same and their arms connected to the runners, a draft bar connected to the bodies of the brackets intermediate the runners, inclined standards secured to the runners and to the rear bracket and extending upwardly and rearwardly, a shaft journaled in the arms of the rear bracket and adjustable vertically of the said arms, an auxiliary frame comprising a central and lateral bars, the said bars being connected and journaled at their front ends on the shaft, the central bar extending rearwardly of the lateral bars, handles connected to the auxiliary frame and extending rearwardly, a blade supporting standard mounted to slide vertically at the rear end of each lateral bar, an inwardly and rearwardly extending blade connected with the lower end of each of the supporting standards, a deflecting device adjustably connected with the rear end of the central bar, and a yielding connection between the auxiliary frame and the standards.

3. A machine of the character specified, comprising laterally spaced runners, approximately U-shaped brackets having their bodies arranged transversely of the runners above the same and their arms connected to the runners, a draft bar connected to the bodies of the brackets intermediate the runners, inclined standards secured to the runners and to the rear bracket and extending upwardly and rearwardly, a shaft journaled in the arms of the rear bracket and adjustable vertically of the said arms, an auxiliary frame journaled at its front end on the shaft, a yielding connection between the rear end of the said frame and the standards, said connection being adjustable, handles connected with the said auxiliary frame, a deflecting device adjustable vertically of the said frame at the rear end thereof, and a blade connected to the auxiliary frame at each side thereof and in front of the deflecting device, each of the said blades extending inwardly and rearwardly.

4. A machine of the character specified, comprising a main frame, an auxiliary frame, a pivotal connection between the front end of the auxiliary frame and the main frame, said connection being adjustable vertically, a yielding connection between the rear end of the auxiliary frame and the main frame, handles connected with the auxiliary frame, a cutting blade supported at each side of the auxiliary frame at the rear end thereof and adjustable vertically thereof, each blade extending inwardly and rearwardly, and a deflecting device adjustable vertically on the auxiliary frame behind the said blade.

5. A machine of the character specified, comprising a main frame, substantially U-shaped in cross section, a shaft arranged transversely of the main frame and adjustable vertically, an auxiliary frame pivoted at its front end on the shaft, springs supporting the rear end of the auxiliary frame, cutting devices adjustable vertically on the said auxiliary frame, a deflecting device in rear of the cutting devices and adjustable vertically on the frame, and handles connected with the frame.

6. A machine of the character specified, comprising a main frame substantially U shape in cross section, a shaft arranged transversely of the main frame and adjustable vertically thereof, an auxiliary frame pivoted at its front end on the shaft, springs supporting the rear end of the auxiliary frame, cutting devices adjustable vertically on the said auxiliary frame, and a deflecting device in rear of the cutting devices.

7. A machine of the character specified, comprising a main frame substantially U shape in cross section, a shaft arranged transversely of the main frame and adjustable vertically thereon, an auxiliary frame pivoted at its front end on the shaft, springs supporting the rear end of the auxiliary frame, and cutting devices adjustable vertically on the said auxiliary frame.

THEOPHILE $\overset{his}{\times}$ LAROSE.
mark

Witnesses:
J. A. BARTHET,
L. A. FLANDRY, Jr.